United States Patent [19]
Kawamura et al.

[11] Patent Number: 5,497,212
[45] Date of Patent: Mar. 5, 1996

[54] REWINDING DEVICE FOR CAMERAS

[75] Inventors: Kunio Kawamura, Kawachinagano; Hiroyuki Okada, Sakai; Sadafusa Tsuji, Tondabayashi; Masaaki Chikasaki, Toyonaka; Michihiro Iwata; Shuji Izumi, both of Sakai, all of Japan

[73] Assignee: Minolta Camera Kabushiki Kaisha, Osaka, Japan

[21] Appl. No.: 203,759

[22] Filed: Mar. 1, 1994

Related U.S. Application Data

[63] Continuation of Ser. No. 794,512, Nov. 19, 1991, abandoned.

[30] Foreign Application Priority Data

Nov. 20, 1990 [JP] Japan ................................. 2-316295

[51] Int. Cl.⁶ .............................. G03B 7/00; G03B 17/02
[52] U.S. Cl. ...................................... 354/21; 354/288
[58] Field of Search .............................. 354/21, 207, 214, 354/215, 217, 288

[56] References Cited

U.S. PATENT DOCUMENTS

| | | | |
|---|---|---|---|
| Re. 34,168 | 1/1993 | Ohmura et al. | 354/145.1 |
| 4,149,793 | 4/1979 | Date | 354/288 |
| 4,373,795 | 2/1983 | Kimura et al. | 354/173 |
| 4,714,335 | 12/1987 | Malloy Desormeaux | 354/214 |
| 4,887,114 | 12/1989 | Yamamoto et al. | 354/288 |
| 4,947,197 | 8/1990 | Smart et al. | 354/214 |
| 4,965,600 | 10/1990 | Smart et al. | 354/212 |
| 4,994,828 | 2/1991 | Smart | 354/21 |
| 4,994,833 | 2/1991 | Cocca | 354/207 |
| 5,032,861 | 7/1991 | Pagano | 354/275 |
| 5,079,579 | 1/1992 | Pagano et al. | 354/288 |
| 5,231,438 | 7/1993 | Smart | 354/281 |

FOREIGN PATENT DOCUMENTS

55-46732  4/1980  Japan.

*Primary Examiner*—Michael L. Gellner
*Assistant Examiner*—Nicholas J. Tuccillo
*Attorney, Agent, or Firm*—Burns, Doane, Swecker & Mathis

[57] ABSTRACT

A camera using a film cartridge in which whether the film is exposed or unexposed can be distinguished by the phase of rotation of a shaft to rewinding a film, wherein said camera comprising: a film chamber to receive the film cartridge, a lid of the film chamber to capable of receiving the film cartridge in the film chamber when the lid is opened, a driving member which is connected with the shaft of the film cartridge and for driving the shaft, and a block member for blocking opening of the lid of the film chamber when the driving member is not the phase of rotation corresponding to the phase of rotation of the shaft in which the film is exposed.

15 Claims, 6 Drawing Sheets

REWINDING DEVICE FOR CAMERAS

This application is a continuation of application Ser. No. 07/794,512, filed Nov. 19, 1991, abandoned.

BACKGROUND OF THE INVENTION

1. Field of the Invention

The present invention relates to a rewinding device for cameras. More specially, the invention relates to a rewinding device adapted to a manual winding camera with a manual rewinding knob in which such a film cartridge is used that the leader portion or tip of the film is entirely rewound into the cartridge in the both cases of unused and used film.

2. Description of the Related Art

There has been suggested a specific combination of a film cartridge and a camera in Japanese Laid-Open Patent Application No. Hei.2-114248. In such a combination, the film cartridge has a film winding shaft and a casing having a film gate for keeping the film wound on the winding shaft lightproof. And the feature of the film cartridge is that the abovementioned winding shaft is set in a predetermined phase of rotation in the state of unused film.

According to the Laid-Open Patent Application, both of the winding shaft of the unused film cartridge and a fork of the camera before loading the film cartridge are set at a predetermined phase of rotation. Therefore, the film cartridge can be loaded to the camera promptly, with any misfunctioning or trouble effectively prevented.

In the abovementioned Laid-Open Patent Application, the leader portion of the film is entirely rewound into the casing in the state of unused film as well as used film for the convenience of handling the film cartridge. And when the leader portion is thrust outside the cartridge to a winding shaft on the camera side by means of a film thrusting mechanism in the camera and connected with the winding shaft, the film loading is completed. Accordingly, loading action is simplified because it is needless to pull out the leader portion nor adjust the length thereof.

As to the conventional film cartridge well-known to public heretofore, on the contrary, a part of the leader portion of the film is out of the casing in the state of unused film. To load the film, the leader portion has to be pulled for a certain length and connected to the winding shaft in the camera. When the film is finished, the film is entirely rewound into the casing. Therefore, distinction between used and unused cartridge is made by whether the leader portion of the film is out of the casing or not.

As mentioned above, however, as to the cartridge disclosed in the abovementioned Japanese Laid-Open Patent Application No. Hei.2-114248, the leader portion of the film is in the cartridge in the case of both unused and used cartridges. So, it is impossible to know whether the cartridge is unused or used by means of the leader portion of the film.

Accordingly, in the cartridge disclosed in the abovementioned Japanese Laid-Open Patent Application No. Hei.2-114248, the phase of rotation of the winding shaft of the cartridge is utilized to represent or inform the camera whether the cartridge is used or unused. That is, the phase of rotation of the abovementioned winding shaft of the cartridge in the unused state is different from that in the used state to make it possible to judge the state of the cartridge. Further, the used cartridge is prevented from being used again by means of setting the fork at a predetermined phase of rotation connectable only with the winding shaft of the unused cartridge at the predetermined phase of rotation.

Figure 5:
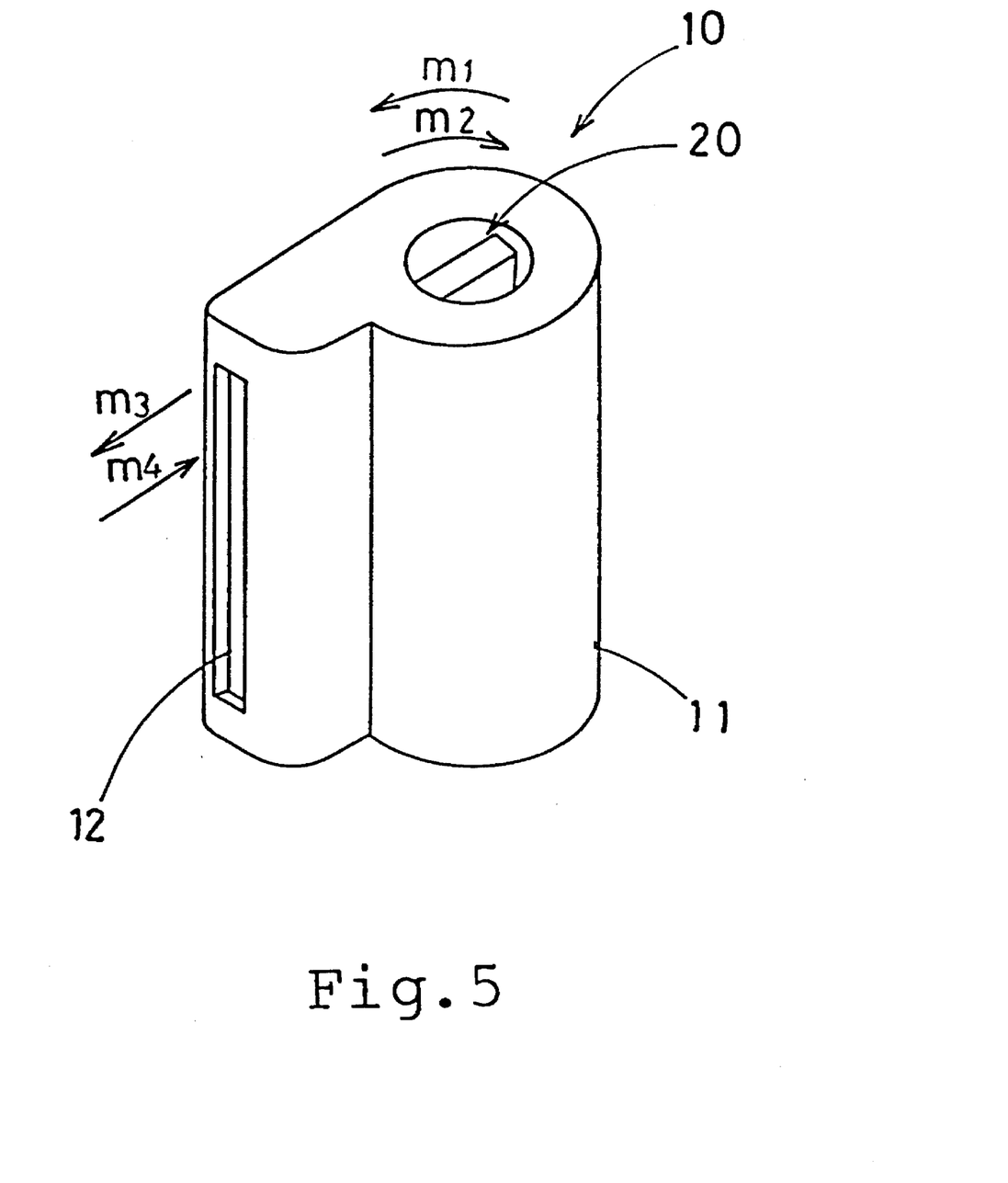
FIG. 5 is an external perspective view showing a concrete example of a film cartridge adaptable for the present invention.

The phase of rotation of the winding shaft of the cartridge is represented as in the illustration of the cartridge 10 in FIG. 5, for instance. The winding shaft 20 is located in the cartridge 10. The winding shaft 20 is composed to rotate in connection with the fork (not shown) of the driving portion in the camera body. When the winding shaft 20 is rotated in the direction of arrow m1, the film is thrust out of the film gate 12 (in the direction of arrow m3). On the other hand, when the winding shaft 20 is rotated in the direction of arrow m2, the film that has been out is rewound into the case 11 (in the direction of arrow m4).

In a motor winding camera, the winding shaft can be controlled by the camera to stop at a predetermined phase of rotation after the rewinding is finished.

In manual winding camera, however, the film is wound by manually rotating the rewinding knob. Accordingly, the operator has to adjust the winding shaft at the abovementioned predetermined phase of rotation when terminating the operation of the rewinding knob. This makes the operation difficult.

SUMMARY OF THE INVENTION

An object of the present invention is to provide a camera having a mechanism for making the film cartridge display that the cartridge is a "used film" when the used film cartridge is taken out of the camera with a simple structure.

A winding device of the camera of the present invention comprises a obstructing means for obstructing the opening operation of the lid of the film chamber when the rewinding knob is not at the phase of rotation in the state of "used film".

A winding device of the camera of the present invention comprises a obstructing means for obstructing the opening operation of the lid of the film chamber when the winding shaft is not at the phase of rotation in the state of "used film".

A winding device of the camera of the present invention comprises a obstructing means for obstructing the opening operation of the lid of the film chamber when the indicating means does not indicate the "used state" of the film.

According to the present invention, the lid of the film chamber can be opened only when the rewinding knob is located at the predetermined phase of rotation. Therefore, it is easy to control the rewinding knob certainly to stop at the predetermined phase of the rotation. As a result that the rewinding knob is certainly controlled to stop at the phase of rotation, it becomes possible to indicate the state of used cartridge certainly if any indication of the used cartridge is shown on its phase of rotation.

Further, even if the lid opening knob is operated by mistake in the state that the film rewinding has not completed, there is little possibility that the lid of the film chamber is opened. Consequently, the rewinding device of the present invention effectively functions as a safety device not to expose the used film.

If the marks are set on both of the abovementioned rewinding knob and the camera body and the marks correspond to each other when the abovementioned rewinding knob is at the predetermined phase of rotation, the operator can easily stop the rewinding knob at the abovementioned predetermined phase of rotation when he or she finish rewinding the film.

Further, the used cartridge can be easily distinguished by seeing its rotational angle of the phase. For example, if a indicating window is located on the camera to face to the indicator, the used cartridge can be easily distinguished by seeing the window when the winding knob is at the phase of rotation of the used cartridge, and the cartridge can be taken out.

BRIEF DESCRIPTION OF THE DRAWINGS

FIG. 2b is an illustration showing the state of each portion on the way of sliding a lid opening knob in the direction of arrow M3 from the state of FIG. 2a.

DETAILED DESCRIPTION OF THE PREFERRED EMBODIMENT

An embodiment of the present invention is described with reference to the accompanying drawings.

Figure 1:
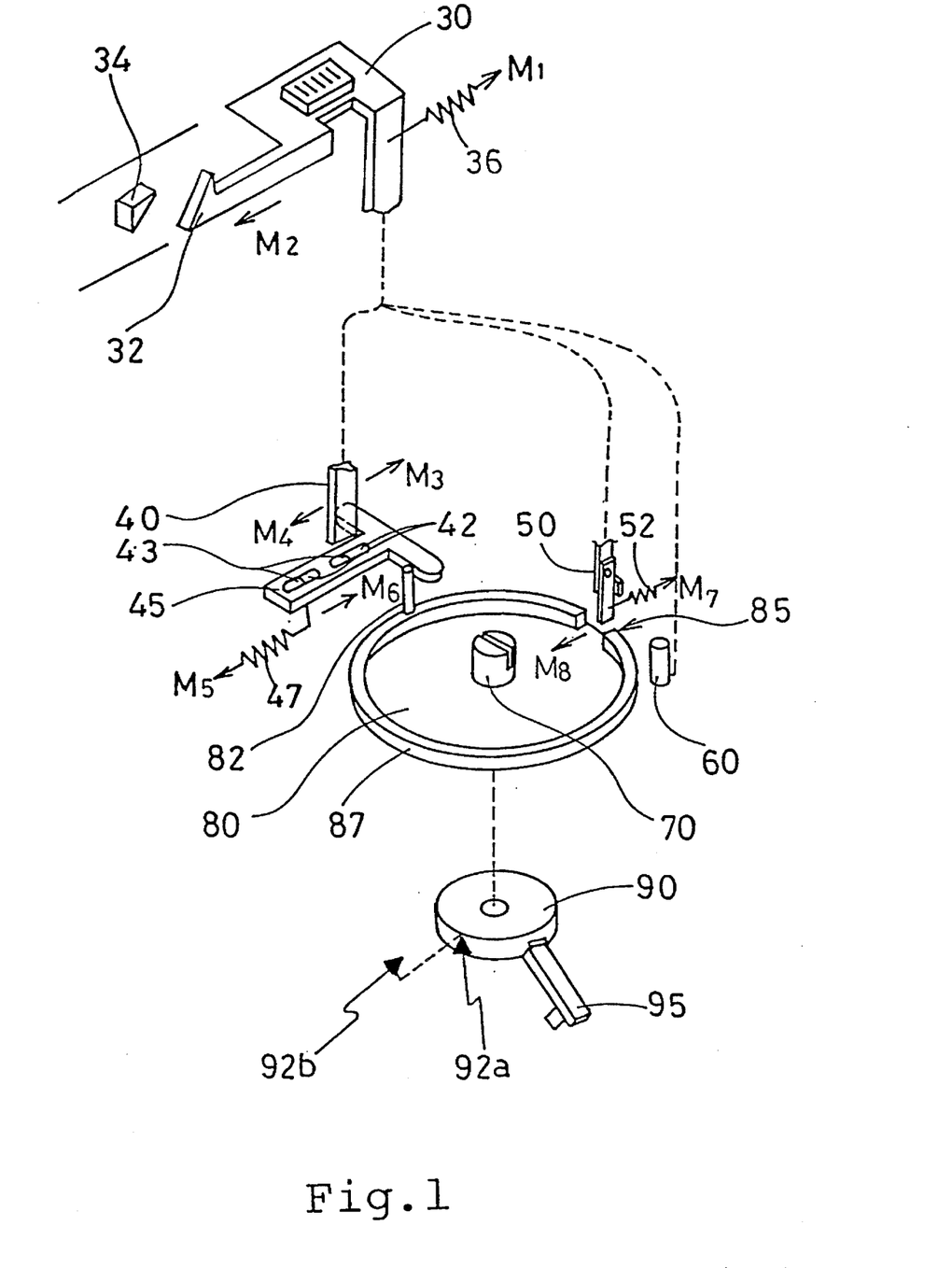
FIG. 1 is a schematic perspective view showing a main structure of an embodiment of the present invention.

Referring to FIG. 1, the embodiment of the present invention includes the first arm 40, the second arm 50 and a lock cancelling pin 60 which all interlock with a lid opening knob 30, the embodiment further including a fork resetting lever 45, a fork 70, a control ring 80, and a rewinding knob 90.

When a lid opening knob 30 is slid in the direction of arrow M2, the first arm 40 moves in the direction of arrow M4. On the contrary, when the lid opening knob 30 is slid in the direction of arrow M1, the first arm 40 moves in the direction of arrow M3.

Figure 3:
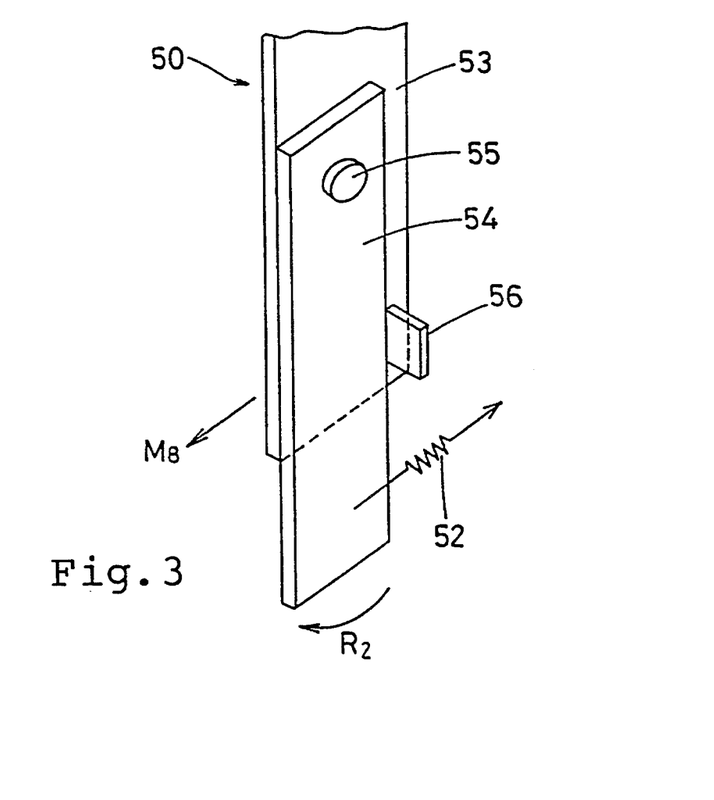
FIG. 3 is an external perspective view showing a main portion of a second arm.

On the other hand, when the lid opening knob 30 is slid in the direction of arrow M2, the second arm 50 moves in the direction of arrow M8. When the lid opening knob 30 is slid in the direction of arrow M1, on the contrary, the second arm 50 moves in the direction of arrow M7. As in FIG. 3, the second arm 50 consists of a supporting portion 53, a movable portion 54, a shaft 55 on a supporting portion 53 for rotatably supporting the movable portion 54, a stopper 56 fixed on the supporting portion 53, and a spring 52 for urging the movable portion 54 toward the direction of arrow M7. The movable portion 54 can rotate around the shaft 55 in the direction of arrow R2, but cannot rotate in the opposite direction blocked by the stopper 56.

Back to FIG. 1, the tip of the lock cancel pin 60 touches a cam (not shown) which interlocks or is formed in one body with the lid opening knob 30. The lock cancelling pin 60 retracting when the lid opening knob 30 is slid in the direction of arrow M2, on the contrary, the lock cancelling pin 60 projecting, when the lid opening knob 30 is slid in the direction of arrow Mi.

The fork resetting lever 45 is urged in the direction of arrow M5 by a spring 47, and is able to move along a line defined between arrows M5 and M6 by means of guides 43 fitted to long holes 42. When the first arm 40 contacting the fork resetting lever 45 moves in the direction of arrow M4, the fork resetting lever 45 follows thereto toward the direction of arrow M5 with the contact between the fork resetting lever 45 and the first arm 40 kept by means of the spring force.

The fork 70 is formed to be able to engage with a connecting portion of the abovementioned winding shaft 20 only at a predetermined phase of rotation.

A control ring 80 has a circular wall 87 with its center at the abovementioned fork 70, the wall 87 having a gap 85. A pin 82 is provided on the wall 87 at a predetermined position where the pin 82 is touchable the fork reset lever 45.

Figure 4A:
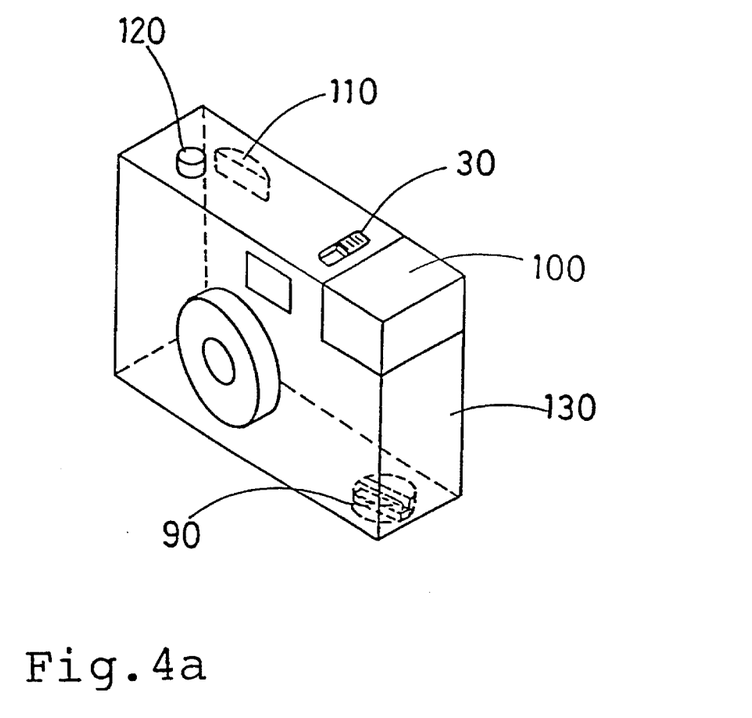
FIG. 4a is an external perspective view of a camera that is adaptable for the present invention with a lid of a film chamber closed.

The rewinding knob 90 is set at the bottom of a camera body 130 as indicated in FIG. 4a. An operator can rotate the rewinding knob 90 with his or her fingers at a handle 95. There is a set mark 92a on the rewind knob 90. By rotating the rewind knob 90, the set mark 92a is adjustable to a set mark 92b which is located near the rewind knob 90 at the bottom of the camera body 130.

The abovementioned fork 70 and the control ring 80 interlock with the rewind knob 90 to rotate in a body.

Figure 4B:
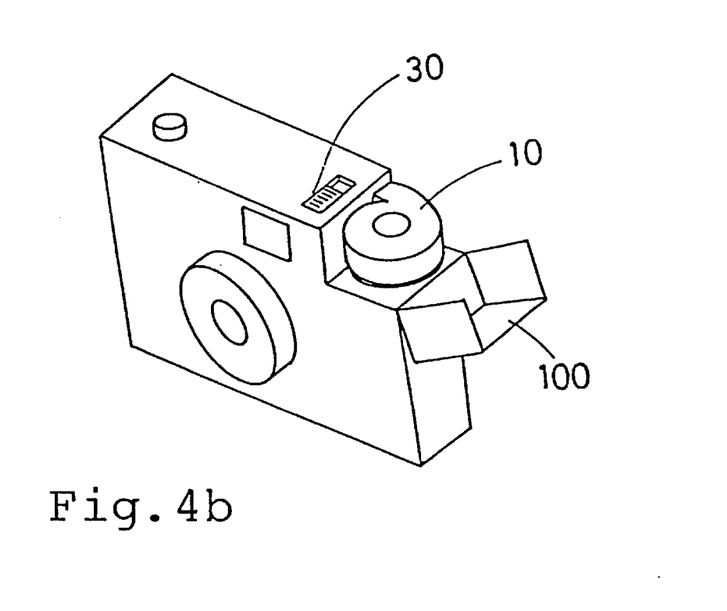
FIG. 4b is an external perspective view of a camera that is adaptable for the present invention with a lid of a film chamber open.

The present embodiment is applicable to a hand-winding camera as shown in FIG. 4a and 4b. Such a hand-winding camera can be used as follows.

First of all, the lid opening knob 30 is to be slid to open a lid 100 as in FIG. 4b. As shown in FIG. 1, the lid opening knob 30 is urged toward the direction of arrow M1 by a spring 36. The lid opening knob 30 is to be slid toward the direction of arrow M2 against the spring force, which releases a lock (not shown) of the lid 100 so that the lid 100 is opened as in FIG. 4b. The lid opening knob 30 is kept at the slid position with a knob lock pawl 32 thereof engaged by a pawl 34 that is formed on the camera body 130.

A film chamber (not shown) is formed inside the camera body 130 that have been covered by the lid 100. At the bottom of the film chamber, the fork 70 and the control ring 80 are installed as referred to in FIG. 1. When the lid 100 is closed with a cartridge 10 as in FIG. 5 put into the film chamber, the connection of the pawl 34 in the camera body 130 and the knob lock pawl 32 comes off, and the lid opening knob 30 slides in the direction of arrow M1 back to the previous position by means of the spring 36. (see FIG. 4a)

As mentioned above, the fork 70 and the rewinding knob 90 can rotate in one body. Consequently, the abovementioned winding shaft 20 which is connected with the fork 70 can be rotated by the rewinding knob 90. On the other hand, the present hand-winding camera is structured to rotate the rewinding knob interlocking with a winding knob 110. Therefore, a film is forwarded from a film gate 12 of the cartridge 10 to a wind up shaft (not shown) in the camera body 130 by rotating the winding knob 110. The entirety of winding knob 110 is a disk to be rotated by a operator, but only a part outside the camera body 130 is shown in FIG. 4a. Further, a wind up shaft is provided to rotate together with the winding knob 110. On the other hand, although the abovementioned rewinding knob 90 interlocks with the winding knob 110, the rewinding knob 90 rotate slower than the winding knob 110. So, when the tip of a film reaches the wind up shaft and the film begins to be wound up by the rotation of the wind up shaft, the winding shaft 20 becomes to idle by means of a planet gear mechanism etc.

The camera can be ready for a shot for the first frame of the film if the winding knob 110 is rotated with a film counter (not shown) observed. Photographing is made by the exposure responsive to the release button 120, and the film is advanced by the winding knob 110 after the release. When all the film is used, the rewinding knob 90 is to be rotated in the reversed direction to rewind the film into the case 11 (FIG. 5).

After the film rewinding is finished (at this time, all the film is wound back to the case 11), the rewind apparatus of the present embodiment operates as indicated in FIG. 2a to FIG. 2e in response to taking out the cartridge 10 from the film chamber. In this connection, the movement of each portions are shown in FIG. 2a to FIG. 2e, but the loaded cartridge itself or the relative position thereof is omitted from the drawings.

Figure 2A:
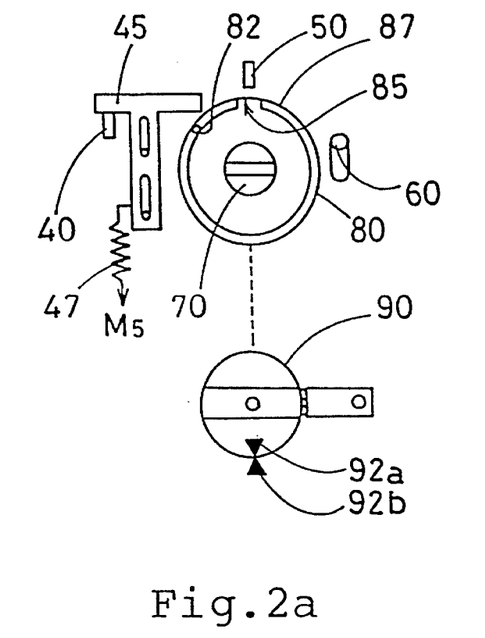
FIG. 2a is an illustration showing the state of each portion in the situation that a cartridge is still loaded in a film chamber after a film rewind is finished.

FIG. 2a shows the state of each portions in the situation that the cartridge 10 (FIG. 5) is still loaded in the film chamber (not shown) after a film rewind is finished.

As mentioned above, the rewinding knob 90 and the bottom of the camera body 130 (FIG. 4a) are provided with set marks 92a and 92b respectively, which coincided with each other when the rewinding knob 90 is at the predetermined phase of rotation. If the rewinding knob 90 is rotated to adjust the set mark 92a thereon to the set mark 92b on the camera body 130, the gap 85 on the control ring 80 rotating with the rewind knob 90 faces the second arm 50.

At this time, as the fork 70 also rotates with the control ring 80 and the rewinding knob 90 together, the winding shaft 20 connected with the fork 70 also rotates to a rotational position of a predetermined phase corresponding with the fork 70. Further, regarding the cartridge 10 applied to the present embodiment, the winding shaft 20 is locked by a lock member (not shown) in the condition of the cartridge 10 alone outside the camera. However, when the cartridge is loaded in the film chamber, such a lock is canceled by the lock cancel pin 60, and the winding shaft 20 become able to rotate freely.

As the gap 85 faces to the second arm 50, the lid opening knob 30 can be slid in the direction of arrow M2. If abovementioned set marks 92a and 92b do not coincide with each other, however, the lid opening knob 30 cannot be slid as the second arm 50 will touch the wall 87 of the control ring 80.

Figure 2B:
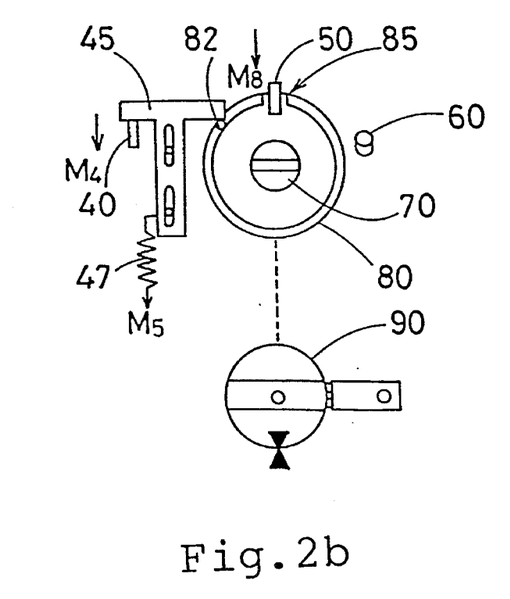

FIG. 2b shows the state of each portion on the way of sliding the lid opening knob 30 in the direction of arrow M2 from the state of FIG. 2a.

When the lid opening knob 30 is slid in the direction of arrow M2, lock cancel pin 60, which has been projecting in the condition of FIG. 2a retracts as in FIG. 2b to have the winding shaft 20 be locked. As the winding shaft 20 in the cartridge 10 is thus made unrotatable, the fork 70, the control ring 80 and the rewind knob 90 also are locked since these are to rotate with the winding shaft 20 in one body. At the same time, the first arm 40 moves in the direction of arrow M4 and the second arm 50 moves in the direction of arrow M8 into the gap 85. From the state of FIG. 2a till the state of FIG. 2b (i.e., till the state that the fork reset lever 45 touches the pin 82), the fork reset lever 45 follows the lid opening knob 30 in the direction of arrow M5 by means of the force of spring 47.

Figure 2C:
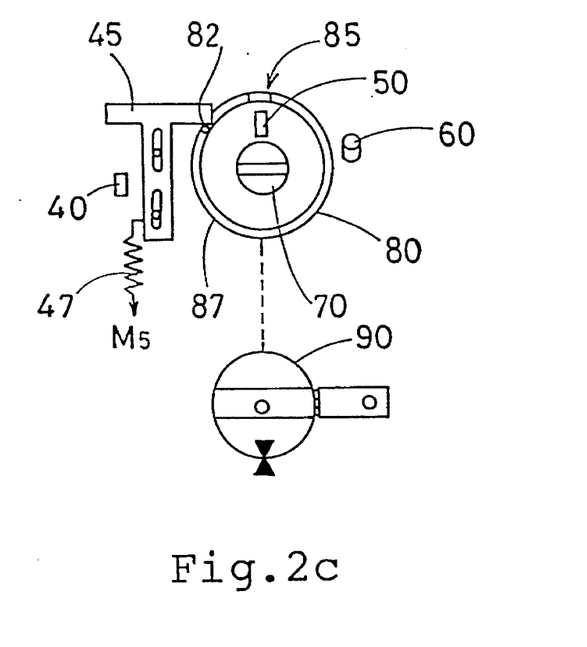
FIG. 2c is an illustration showing the state of each portion when the sliding of a lid opening knob is finished and a knob lock pawl connect with a pawl on a camera body.

FIG. 2c shows the state of each portion when the sliding of the lid opening knob 30 is finished and the knob lock pawl 32 connects with the pawl 34 on the camera body.

In spite of the lid opening knob 30 with the first arm 40 sliding further from the state of FIG. 2b to the state of FIG. 2c, fork reset lever 45 remains in the position coming in contact with the pin 82 because the winding shaft 20 is locked. On the other hand, the second arm 50 goes ahead and passes through the gap 85 to stop between the fork 70 and the wall 87. The camera has to be so structured that the cartridge 10 may not interface the movement of the second arm 50 until it stops inside the wall 87. For example, in the position that the winding shaft 20 connects with the fork 70, the second arm 50 have to move between the bottom of the cartridge 10 and the control ring 80. Or, the control ring 80 may be alternatively provided so that the wall 87 faces to the rewinding knob 90 and the second arm 50 may move on the side of the rewind knob 90 instead of the cartridge side.

Figure 2D:
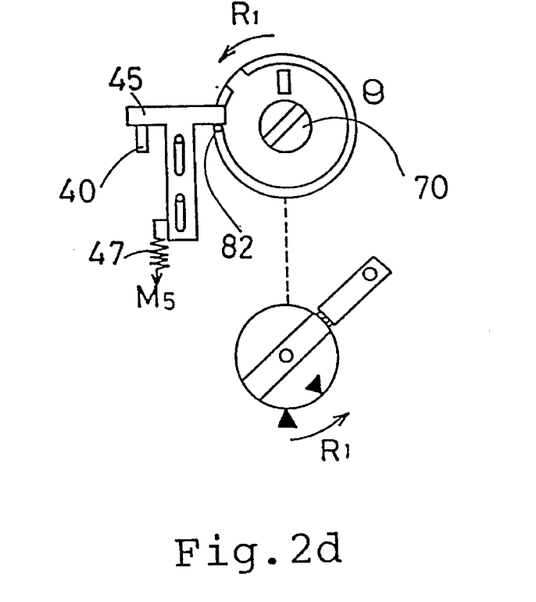
FIG. 2d is an illustration showing the state of each portion when a cartridge is taken out from a camera with a lid open as in FIG. 4b.

FIG. 2d shows the state of each portion when the cartridge 10 is taken out from the camera with the lid 100 open as in FIG. 4b.

In the state of FIG. 2c, the fork resetting lever 45 that have been urged toward the direction of M5 by the spring 47 is remaining in the position keeping in contact with the pin 82. If the cartridge 10 is taken out of the film chamber, fork resetting lever 45 moves until it touches the first arm 40 that is stationary. At this time, the pin 82 that touches the fork resetting lever 45 is pushed by the fork resetting lever 45 and moves. With the movement of the pin 82, the control ring 80, the fork 70, and the rewinding knob 90 rotate together in the direction of arrow R1.

The phase of rotation of the fork 70 after the rotation corresponds to the phase of rotation of the winding shaft 20 of an unused film. That is, an unused cartridge 10 can be loaded in the film chamber and the lid 100 can be closed only in the condition of FIG. 2d. On the other hand, when the case 11 of the cartridge 10 is loaded in the film chamber, its loading direction is definite according to the shape of the case. Therefore the position to stop the first arm 40 is predetermined so that the winding shaft 20 of the unused cartridge 10 is connectable only with the fork 70 in the state of FIG. 2d when the cartridge 10 is loaded in the film chamber. Consequently, even if a used cartridge 10 (such as the one taken out of the film chamber in the condition of FIG. 2c) is tried to be loaded in the state of FIG. 2d, the lid 100 cannot be closed because the phase of rotation of the fork 70 does not correspond and the fork 70 does not connect with the winding shaft 20 of the unused cartridge.

Figure 2E:
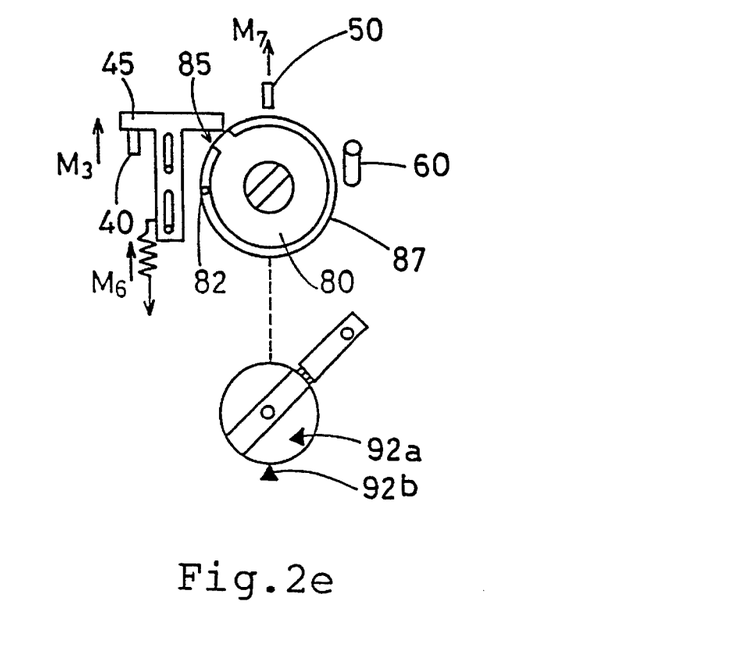
FIG. 2e is an illustration showing the state of each portion when a lid (FIG. 4a and 4b) is closed.

FIG. 2e shows the state of each portion when the lid 100 (see FIGS. 4a and 4b) is closed. At this time, an unused cartridge 10 may be loaded in the film chamber or the film chamber can be left empty.

If the lid 100 is closed in the state of FIG. 2d, the connection of the pawl 34 on the camera body and the knob lock pawl 32 shown in FIG. 1 comes off and the lid opening knob 30 slide (in the direction of arrow M1) back to the previous position by means of the spring 36 (see FIG. 4a). At this time, interlocking with the lid opening knob 30, the first arm 40 moves in the direction of arrow M3 and the second arm 50 moves in the direction of arrow M7.

The spring force urging the first arm 40 (in the direction of arrow M1 by the spring 36) is greater than the spring force urging the fork resetting lever 45 (in the direction of arrow M5 by the spring 47). Therefore, the fork resetting lever 45 moves in the direction of arrow M6 with the movement of the first arm 40. Consequently, the pin 82 become apart from the fork resetting lever 45 with the movement of the fork resetting lever 45, and so the control ring 80 and every portion that interlocks with the control ring 80 become able to rotate freely.

On the other hand, the second arm 50 does not face the gap 85 but the wall 87 in this condition. When the movable portion 54 (FIG. 3) touches the wall 87, the movable portion 54 rotates about the shaft 55 in the direction of arrow R2 in accordance with the movement of the supporting portion 53 against the spring force of the spring 52. When the tip of the movable portion 54 gets over the wall 87 with the rotation of the movable portion 54, the movable portion 54 is urged by the spring 52 toward the previous position where the movable portion 54 touches the stopper 56. And interlocking with the lid opening knob 30 sliding in the direction of arrow M1, the lock canceling pin 60 projects again.

When an unused cartridge 10 is loaded again and the film is wound up with the winding knob 110 (FIG. 4) as mentioned above, the camera is ready for a shot.

On the other hand, if the lid 100 is closed without loading the cartridge 10 in the film chamber, it is necessary to adjust the set marks 92a and 92b each other and to slide the lid opening knob 30 (in the direction of arrow M2) to open the lid 100 again. In this condition, although the lock canceling pin 60 retracts, each portion operates with the state of FIG. 2c skipped because the cartridge 10 is not loaded in the film chamber. Therefore, the fork resetting lever 45 moves from the state of FIG. 2b to the state of the FIG. 2d with the contact of the fork resetting lever 45 to the first arm 40 kept during the movement of the first arm 40.

What is claimed is:

1. A camera using a film cartridge, wherein the film cartridge has a film rewinding shaft and indicates whether a film in said film cartridge is exposed or unexposed by a phase of rotation of the film rewinding shaft, said camera comprising:

a film cartridge chamber for accommodating said film cartridge, said film cartridge chamber having an opening through which said film cartridge is inserted into said film cartridge chamber and taken out therefrom;

a lid of said film cartridge chamber that is movable for opening and closing said opening;

a driving mechanism which engages with and drives said film rewinding shaft; and a blocking mechanism which prevents said lid from opening when said driving mechanism is not in a phase of rotation in which an exposed condition of film is indicated after film rewinding is finished.

2. A camera as recited in claim 1, wherein said blocking mechanism permits opening of said lid only when said driving mechanism is in the phase of rotation in which an exposed condition of film is indicated after film rewinding is completed.

3. A camera as recited in claim 1, further comprising an operating member for operating said driving mechanism by manual operation.

4. A camera as recited in claim 3, wherein said film cartridge indicates that the film is exposed when said driving means is positioned at a phase of rotation corresponding to said phase of rotation of said film rewinding shaft in which exposure of film is indicated.

5. A camera using a film cartridge, wherein the film cartridge has a film rewinding shaft and indicates whether a film in said film cartridge is exposed or unexposed by a phase of rotation of the film rewinding shaft, said camera comprising:

a film cartridge chamber for accommodating said film cartridge, said film cartridge chamber having an opening through which said film cartridge is inserted into said film cartridge chamber and taken out therefrom;

a lid of said film cartridge chamber that is movable for opening and closing said opening;

a driving mechanism which engages with and drives said film rewinding shaft and by which said phase of rotation of the film rewinding shaft is determined; and a blocking mechanism which prevents said lid from opening when said film rewinding shaft is not in a phase of rotation in which an exposed condition of film is indicated after film rewinding is finished.

6. A camera as recited in claim 5, wherein said blocking mechanism permits opening of said lid only when said film rewinding shaft is in the phase of rotation in which an exposed condition of film is indicated after film rewinding is completed.

7. A camera as recited in claim 5, further comprising an operating member for operating said driving mechanism by manual operation.

8. A camera as recited in claim 7, wherein said film cartridge indicates that the film is exposed when said film rewinding shaft is positioned at a phase of rotation in which exposure of film is indicated.

9. A camera using a film cartridge, wherein the film cartridge has a film rewinding shaft that is in a specific phase of rotation when film in said cartridge is exposed and a tip of a film is retracted in said film cartridge regardless of whether the film is exposed or unexposed, said camera comprising:

a film cartridge chamber for accommodating said film cartridge, said film cartridge chamber having an opening through which said film cartridge is inserted into said film cartridge chamber and taken out therefrom;

a lid of said film cartridge chamber that is movable for opening and closing said opening;

a driving mechanism which engages with and drives said film rewinding shaft;

a knob member for rotating said driving mechanism in unison with said knob member to rewind said film;

said knob member being in a specific phase of rotation corresponding to said specific phase of rotation of the film rewinding shaft when a tip of exposed film is retracted in said film cartridge by the knob member rotating; and a blocking mechanism which prevents said lid from opening when said film rewinding shaft is not in a phase of rotation in which an exposed condition of film is indicated after film rewinding is finished.

10. A camera as recited in claim 9, wherein said blocking mechanism is rotated with said knob member.

11. A camera as recited in claim 9, wherein said blocking mechanism permits opening of said lid only when said film rewinding shaft is in the phase of rotation in which an exposed condition of film is indicated after film rewinding is completed.

12. A camera as recited in claim 9, further comprising display means for displaying that said knob member is positioned at said specific phase of rotation in which exposure of film is indicated.

13. A camera as recited in claim 12, wherein said display means is set with marks which are provided on said knob member and a camera body, and said marks meet with each other when the phase of rotation of the knob member is positioned at said phase of rotation in which exposure of film is indicated.

14. A camera using a film cartridge wherein the film cartridge has an indicating means to indicate whether a film accommodated in said film cartridge is used or unused, comprising:

a film cartridge chamber for accommodating said film cartridge, said film cartridge chamber having an opening through which said film cartridge is inserted into said film cartridge chamber and taken out therefrom;

a lid of said film cartridge chamber that is movable for opening and closing said opening; and a blocking mechanism that prevents said lid from opening when said indicating means does not indicate that said film is used after film rewinding is finished.

15. A camera as recited in claim 14, wherein said blocking mechanism permits opening of said lid only when said indicating means indicates that said film is used after film rewinding is completed.

* * * * *